United States Patent [19]

Kircher et al.

[11] Patent Number: 5,234,982

[45] Date of Patent: Aug. 10, 1993

[54] TERNARY MIXTURES

[75] Inventors: Klaus Kircher, Leverkusen; Helmut-Martin Meier, Ratingen; Klaus Horn; Helmut Pilzecker, both of Krefeld, all of Fed. Rep. of Germany

[73] Assignee: Bayer Aktiengesellschaft, Leverkusen, Fed. Rep. of Germany

[21] Appl. No.: 793,749

[22] Filed: Nov. 18, 1991

Related U.S. Application Data

[63] Continuation of Ser. No. 661,926, Feb. 26, 1991, abandoned.

[30] Foreign Application Priority Data

Mar. 2, 1990 [DE] Fed. Rep. of Germany ....... 4006519
Nov. 16, 1990 [DE] Fed. Rep. of Germany ....... 4036590

[51] Int. Cl.$^5$ ............................................. C08L 91/06
[52] U.S. Cl. .................................... 524/277; 524/494
[58] Field of Search ............................ 524/277, 494

[56] References Cited

U.S. PATENT DOCUMENTS

| 4,097,435 | 6/1978 | Rawlings et al. | 524/277 |
| 4,313,873 | 2/1982 | Lim | 260/18 TN |
| 4,343,912 | 8/1982 | Lim | 521/90 |

FOREIGN PATENT DOCUMENTS 1359837 7/1974 United Kingdom .
1434621 5/1976 United Kingdom .

Primary Examiner—Paul R. Michl
Assistant Examiner—Edward Cain
Attorney, Agent, or Firm—Joseph C. Gil; Aron Preis

[57] ABSTRACT

A thermoplastic molding composition containing a polycarbonate resin, glass fibers and oxidized polyethylene is disclosed. The composition is suitable for the preparation of molded articles having an improved level of impact strength.

2 Claims, No Drawings

TERNARY MIXTURES

This application is a continuation of application Ser. No. 07/661,926 filed Feb. 26, 1991, now abandoned.

SUMMARY OF THE INVENTION

This invention relates to mixtures containing

A) 40 to 99.8% by weight, preferably 55 to 99.4% by weight and, more preferably 77 to 99.1% by weight thermoplastic aromatic polycarbonates, B) 0.1 to 50% by weight, preferably 0.5 to 40% by weight and more preferably 0.5 to 20% by weight glass fibers and C) 0.1 to 10% by weight, preferably 0.1 to 5% by weight an more preferably 0.4 to 3% by weight oxidized polyethylene having an $\overline{M}n$ (number average molecular weight) in the range form 8,500 to 15,000 and preferably in the range from 9,000 to 14,000, based on 100% by weight A)+B)+C, to process for the production of the mixture and to foams produced from the mixtures.

The mixtures show higher impact strength than those without component C).

DETAILED DESCRIPTION OF THE INVENTION

The Components

The polycarbonate component A) is both a homopolycarbonate and a copolycarbonate. Polycarbonate mixtures both of homopolycarbonates and of copolycarbonates are also suitable.

The polycarbonates of component A) should have weight average molecular weights $\overline{M}_w$ (as determined for example in known manner through the relative solution viscosity or by gel chromatography after preliminary calibration) in the range from 10,000 to 200,000 and preferably in the range from 20,000 to 80,000.

The polycarbonates of component A) are those based on diphenols corresponding to formula a)

HO—D—OH      a)

in which D is a two-bond aromatic radical containing 6 to 50 C atoms and more particularly 12 to 45 C atoms which may also contain hetero atoms or C-containing hetero segments that do not fall within the 6 to 50 C atoms.

Accordingly, the polycarbonates contain bifunctional structural units corresponding to formula b)

—[—O—D—O—C—]—      b)
                ‖
                O in which D is as defined above.

In addition, the polycarbonates of component A) may be branched in known manner (see, for example, DE-PS 2 500 092 and U.S. Pat. No. 4,185,009) by incorporation of small quantities, preferably between 0.05 and 2 mol-%, based on the diphenols used, of trifunctional or more than trifunctional compounds, for example those containing three or more than three OH groups.

Some of the compounds used containing three or more than three phenolic hydroxyl groups include phloroglucinol, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)ethane, 2,6-bis-(2-hydroxy-5'-methylbenzyl)-4-methylphenyl, 2-(4-hydroxyphenyl)-2-(2,4-dihydroxyphenyl)-propane and 1,4-bis-(4,4'-dihydroxytriphenyl)-methyl)-benzene. Some of the other trifunctional compounds are 2,4-dihydroxybenzoic acid, trimesic acid, cyanuric chloride and 3,3-bis-(4-hydroxy-3-methylphenyl)-2-oxo-2,3-dihydroindole.

Suitable diphenols corresponding to formula a) are, for example, those corresponding to formula a)1)

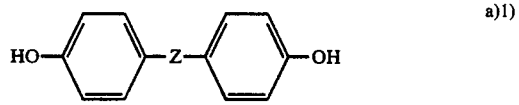

in which Z is a single bond, a $C_{1-8}$ alkylene radical, a $C_{2-12}$ alkylidene radical, a cyclohexylidene radical, a benzylidene radical, a methyl benzylidene radical, a bis-(phenyl)-methylene radical, —S—, —$SO_2$—, —CO— or —O—.

The production of the polycarbonates of component A), for example from the diphenols of formula a)1), is known from the literature or may be produced by methods known from the literature (see, for example, H. Schnell, Chemistry and Physics of Polycarbonates, Interscience Publishers, New York, 1964 or U.S. Pat. Nos. 3,028,365 and 3,275,601).

Other suitable diphenols corresponding to formula a) are, for example, those corresponding to formula a)2)

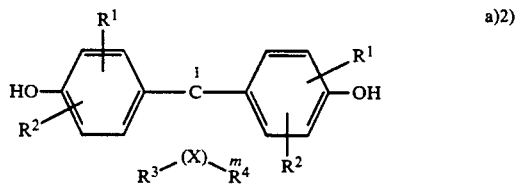

in which $R^1$ and $R^2$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more particularly benzyl, m is an integer of from 4 to 7, preferably 4 or 5, $R^3$ and $R^4$ may be individually selected for each X and independently of one another represent hydrogen or $C_{1-6}$ alkyl and X represents carbon, with the proviso that, at at least one atom X, both $R^3$ and $R^4$ are alkyl.

These diphenols and polycarbonates thereof are described in German patent application P 38 32 396.6 (Le A 26 344).

Examples of diphenols corresponding to formula a) are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones,bis-(hydroxyphenyl)-sulfones, bis-(hydroxyphenyl)-sulfoxides and α,α'-bis-(hydroxyphenyl)diisopropylbenzenes.

These and other suitable diphenols corresponding to formula a) are described, for example, in U.S. Pat. No. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052, 2 211 0956, in FR-PS 1 561 518, in the book by H. Schnell entitled "Chemistry and Physics of Polycarbonates", Interscience Publishers, New York, 1964 and in German patent application P 38 32 396.6 (Le A 26 344).

Preferred diphenols corresponding to formula a) are, for example, 4,4'-dihydroxydiphenyl, 2,2-bis-(4-hydroxyphenyl)-propane, 2,4-bis-(4-hydroxyphenyl)-2-methylbutane,
-bis-(4-hydroxyphenyl)-cyclohexane, α,α'-bis-(4-hydroxyphenyl)-p-diisopropylbenzene and 1,1-bis-(4-hydroxyphenyl)-3,3,5-trimethyl cyclohexane.

Particularly preferred diphenols corresponding to formula a) are, for example, 2,2-bis-(4-hydroxyphenyl)-propane, 1,1-bis-(4-hydroxyphenyl)-cyclohexane and 1,1-bis(4-hydroxyphenyl)-3,3,5-trimethyl cyclohexane.

2,2-Bis-(4-hydroxyphenyl)-propane and 1-bis-(4-hydroxyphenyl)-3,3,5-trimethyl cyclohexane are particularly preferred.

The diphenols corresponding to formula a) may be used both individually and in admixture with one another.

Monofunctional compounds may be used in the usual concentrations as chain terminators for regulating molecular weight. Suitable compounds are, for example, phenol, tert.-butylphenols or other alkyl-$C_{1-7}$-substituted phenols. Small quantities of phenols corresponding to formula c)

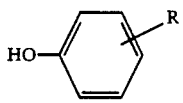

c)

in which R is a branched $C_8$ and/or $C_9$ alkyl radical, are particularly suitable for regulating molecular weight. In the alkyl radical R, the percentage of $CH_3$ protons is between 47 and 89% and the percentage of CH and $CH_2$ protons between 53 and 11%. R is preferably in the o- and/or p-position to the OH group, 20% being the particularly preferred upper limit to the ortho component. The chain terminators are generally used in quantities of from 0.5 to 10 mol-% and preferably in quantities of from 1.5 to 8 mol-%, based on the diphenols used.

Component B

Suitable glass fibers for the molding compounds according to the invention are any commercially available sorts and types of glass fibers, i.e. chopped strands and milled fibers, providing they have been treated with suitable sizes to make them compatible with polycarbonates. The glass fibers used for the production of the molding compounds are made of "E glass" (low alkali glass). E glass as defined in DIN 1259 is an aluminium/-borosilicate glass having an alkali oxide content of less than 1% by weight. Glass fibers 8 to 20 μm in diameter and 3 to 6 mm long (chopped strands) are typically used while milled fibers are preferably used for foamed mixtures. The glass fibers used for foams may even be unsized.

Component C

The oxidized polyethylene to be used in accordance with the invention may be produced in known manner by oxidation of "high-density" or "low-density" polyethylene with air (see GB-PS 918,295). Suitable molecular weights $\overline{M}n$ (number average as determined by gel permeation chromatography) are in the range from 8,500 to 15,000 and preferably in the range from 9,000 to 14,000. The oxygen content of the oxidized polyethylenes to be used in accordance with the invention is from 1% by weight to 7% by weight.

TMPED 191$^{(R)}$, a product of Hoechst AG, is used int eh Examples. It has a molecular weight $\overline{M}n$ (number average, as determined by gel permeation chromatography) of approximately 11,000, an acid value of 10 to 20, a saponification value of 25 to 40 and an oxygen content of approximately 4.55 by weight. The saponification value expresses the content of free carboxyl groups and the content of carboxyl groups formed by ester cleavage (saponification).

Prior Art

It is known that the strength and rigidity of thermoplastics can be increased by incorporation of glass fibers. A detailed description of this technology can be found in the book by P. H. Selde entitled "Glasfaserverstärkte Kunststoffe", Springer-Verlag (1967), pages 307–344.

High molecular weight, thermoplastic aromatic polycarbonates are distinguished in particular by their favorable mechanical, thermal and electrical properties. By comparison, glass-fiber-reinforced high molecular weight, thermoplastic, aromatic polycarbonates show both considerably improved flexural strength and rigidity and also a considerably improved modulus of elasticity. By contrast, the impact strength, notched impact strength and elongation at break of glass-fiber-reinforced polycarbonates are poorer in comparison with corresponding non-reinforced polycarbonates. Now, efforts to produce glass-fiber-reinforced polycarbonates are begin directed towards increasing the adhesion between fiber and polymer matrix by using suitably sized glass fibers and also additives or coupling agents in order in this way to improve the toughness and resilience properties of glass-fiber-reinforced polycarbonate molding compounds.

According to the invention, the technical problem has been solved by the addition of an oxidized polyethylene.

It is known from EP-OS 0 007 437 or U.S. Pat. No. 4,313,873 that oxidized polyethylene can be added to polycarbonates or ABS polyers to enable blowing agent concentrates to be produced. In this case, however, the oxidized polyethylene is used as a processing aid and not as an impact modifier.

It is known from DE 3 325 702 A1 of the Mobay Chem. Corp. that the oxidized homopolymer can be added as an acidifying agent to mixtures of polycarbonates and ABS polymers. These mixtures have poorer heat resistance than the mixtures according to the invention and, in addition, contain no glass fibers.

The use of oxidized polyethylene having a molecular weight $\overline{M}n$ of 1,500 to 5,000 as a mold release agent for polyester carbonates is claimed in Japanese patent 57/140 538. The mixtures may also contain glass fibers. However, a drastic deterioration in the mechanical property level was observed when the same oxidized polyethylene was correspondingly used for thermoplastic polycarbonates free from ester groups.

It has now surprisingly been found that oxidized polyethylene having an $\overline{M}n$ of 8,500 to 15,000 distinctly improves the impact strength and notched impact strength of glass-fiber reinforced polycarbonate and glass-fiber reinforced polycarbonate foam.

The mixtures according to the invention of components A), B) and C) are prepared by melt-compounding of the polycarbonate with the glass fibers and the oxidized polyethylene at temperatures of 260° to 360° C. and preferably at temperatures of 280° to 320° C. and then cooling and granulating the resulting mixture in known manner.

The twin-screw extruders typically used for mixing polycarbonate and glass fibers may be used for the production of the mixtures according to the invention.

The melt compounding step is carried out at temperatures of 280° to 360° C.

Accordingly, the present invention also relates to a process for the production of the mixtures of components A), B) and C) according to the invention, characterized in that the polycarbonate is melt-compounded with the glass fibers and the oxidized polyethylene at temperatures of 260° to 360° C. and preferably at temperatures of 280° to 320° C. and the mixture obtained is cooled and granulated in known manner.

Known additives for polycarbonates may be incorporated in the usual quantities in the mixtures according to the invention before, during or after their production.

Suitable additives are fillers, such as for example mineral fillers, plasticizers, flow aids, stabilizers against UV light, heat, moisture and oxygen, pigments and flameproofing agents.

Accordingly, the present invention also relates to mixtures consisting of components A), B) and C) according to the invention and at least one additive selected from the group consisting of fillers, plasticizers, flow aids, stabilizers, pigments and flameproofing agents.

The present invention also relates to a process for the production of the mixtures according to the invention consisting of components A), B) and C) according to the invention and at least one additive selected from the group consisting of fillers, plasticizers, flow aids, stabilizers, pigments and flameproofing agents, characterized in that, before or during or after the production of the mixtures of components A), B) and C) according to the invention, at least one of the additives mentioned is incorporated in known manner in the usual quantities for component A).

The mixtures according to the invention may be processed in known manner to moldings of various kinds, for example by injection molding in corresponding machines.

The mixtures according to the invention may also be mixed in known manner with known blowing agents or blowing agent concentrates consisting of polycarbonate and a blowing agent and the resulting mixtures may be processed by injection molding or extrusion to form foamed moldings.

Suitable blowing agents are the usual blowing agents as described, for example, in Angewandte Chemie 64 (1952), 65-76, DE-OS 3 602 014, U.S. Pat. No. 3,442,829, 3,779,954 and 4,097,425. Mixtures or concentrates of blowing agents may also be used. Examples of suitable blowing agents are inorganic blowing agents, such as ammonium carbonate, ammonium hydrogen carbonate, potassium or sodium hydrogen carbonate, etc. inert gases, such as $N_2$, $CO_2$, air, etc., and organic blowing agents, such as diazoisobutyronitrile, 5-phenyl tetrazole, benzamides, dihydrooxadiazinones, etc.

Nucleating agents may also be added to improve the structure of the foam.

Suitable nucleating agents are, for example, titanium dioxide, chalk, silica and talcum.

Accordingly, the present invention also relates to mixtures consisting of components A), B) and C) according to the invention and a blowing agent or a blowing agent concentrate and, optionally a nucleating agent, fillers, plasticizers, flow aids, stabilizers, pigments and/or flameproofing agents.

The present invention also relates to a process for the production of the mixtures according to the invention consisting of components A), B) and C) according to the invention and a blowing agent or a blowing agent concentrate and, optionally a nucleating agent, filler, plasticizers, flow aids, stabilizers, pigments and/or flameproofing agents, characterized in that, before or during or after the production of the mixtures of components A), B) and C) and a blowing agent or blowing agent concentrate, at least one of the other additives mentioned is optionally incorporated in known manner in the usual quantities for component A).

The present invention also relates to foams produced from the mixtures according to the invention consisting of components A), B) and C) and a blowing agent or blowing agent concentrate and, optionally, at least one additive selected from nucleating agents, fillers, plasticizers, flow aids, stabilizers, pigments and flameproofing agents.

The following Examples in which typical starting materials are used in typical quantities are intended to illustrate the invention without limiting it in any way.

A predried homopolycarbonate of 2,2-bis-(4-hydroxyphenyl)-propane having a $\eta_{rel}$ of 1.28, as measured in $CH_2Cl_2$ at 25° C. and at a concentration of 0.5 g per 100 ml $CH_2Cl_2$, and an $\overline{M}w$ of approximately 28,000, as determined by gel chromatography, and an oxidized polyethylene, $\overline{M}w$ approx. 23,000, acid value 10–20, saponification value 25–40 and an oxygen content of 4.5% were used for the following Examples.

The mechanical values of the moldings produced from the mixtures are shown in Table 1.

EXAMPLE 1

9.15 kg polycarbonate are melted in a twin-screw extruder at temperatures of 300° to 320° C. A mixture of 0.5 kg milled fibers, 0.25 kg titanium dioxide and 0.1 kg oxidized polyethylene is then directly introduced into the polycarbonate melt. The polymer strand is cooled and granulated. 10 kg of the granulate are mixed with 300 g of a known polycarbonate blowing agent concentrate consisting of 5% by weight 5-phenyl tetrazole in polycarbonate and the resulting mixture is foamed by injection molding to form moldings having a specific density of 0.9 g cm$^{-3}$.

COMPARISON EXAMPLE 1

Example 1 is repeated without the addition of 0.1 kg oxidized polyethylene.

9.25 kg polycarbonate, 0.5 kg milled fibers and 0.25 kg titanium dioxide were used.

The foamed moldings were produced in the same way as described in Example 1 (density 0.9 g/cm$^3$).

EXAMPLE 2

8.65 kg polycarbonate are melted in a twin-screw extruder at temperatures of 300° to 320° C. A mixture of 1 kg chopped strands, 0.25 kg titanium dioxide and 0.1 kg oxidized polyethylene is then directly introduced into the polycarbonate melt. The polymer strand is cooled, granulated and injection-molded.

COMPARISON EXAMPLE 2

Example 2 is repeated without the addition of 1% by weight oxidized polyethylene.

8.57 kg polycarbonate, 1 kg chopped strands and 0.25 kg titanium dioxide were used.

TABLE 1

|  | Example | | Comp. Example | |
|---|---|---|---|---|
|  | 1 | 2 | 1 | 2 |
| Charpy impact strength[1] according to DIN 53 453 in kJ/m² | nb | nb | 30 | 50 |
| Izod notched impact strength[2] according to ISO 180/1C in J/m | 70 | nb | nd | 40 |

[1] 50 × 6 × 4 mm specimen
[2] 80 × 10 × 4 mm specimen
nb = not broken
nd = not determined

We claim:

1. A method for increasing the impact strength of glass fiber-containing polycarbonate foam comprising
   A) adding about 0.1 to 5 percent of oxidized polyethylene having a number average molecular weight of about 9000 to 14000 to a molding composition containing (i) about 55 to 99.4 percent thermoplastic polycarbonate resin (ii) about 0.5 to 40 percent glass fibers and (iii) an effective amount of blowing agent, said percent being relative to the total weight of said resin, glass fibers and oxidized polyethylene, and
   B) molding a foamed article from said composition.

2. The method of claim 1 wherein said oxidized polyethylene has a molecular weight of about 11000 and is further characterized in having an acid value of 10 to 20, a saponification value of 25 to 40 and an oxygen content of about 4.5 percent by weight.

* * * * *